United States Patent Office 3,183,754
Patented May 18, 1965

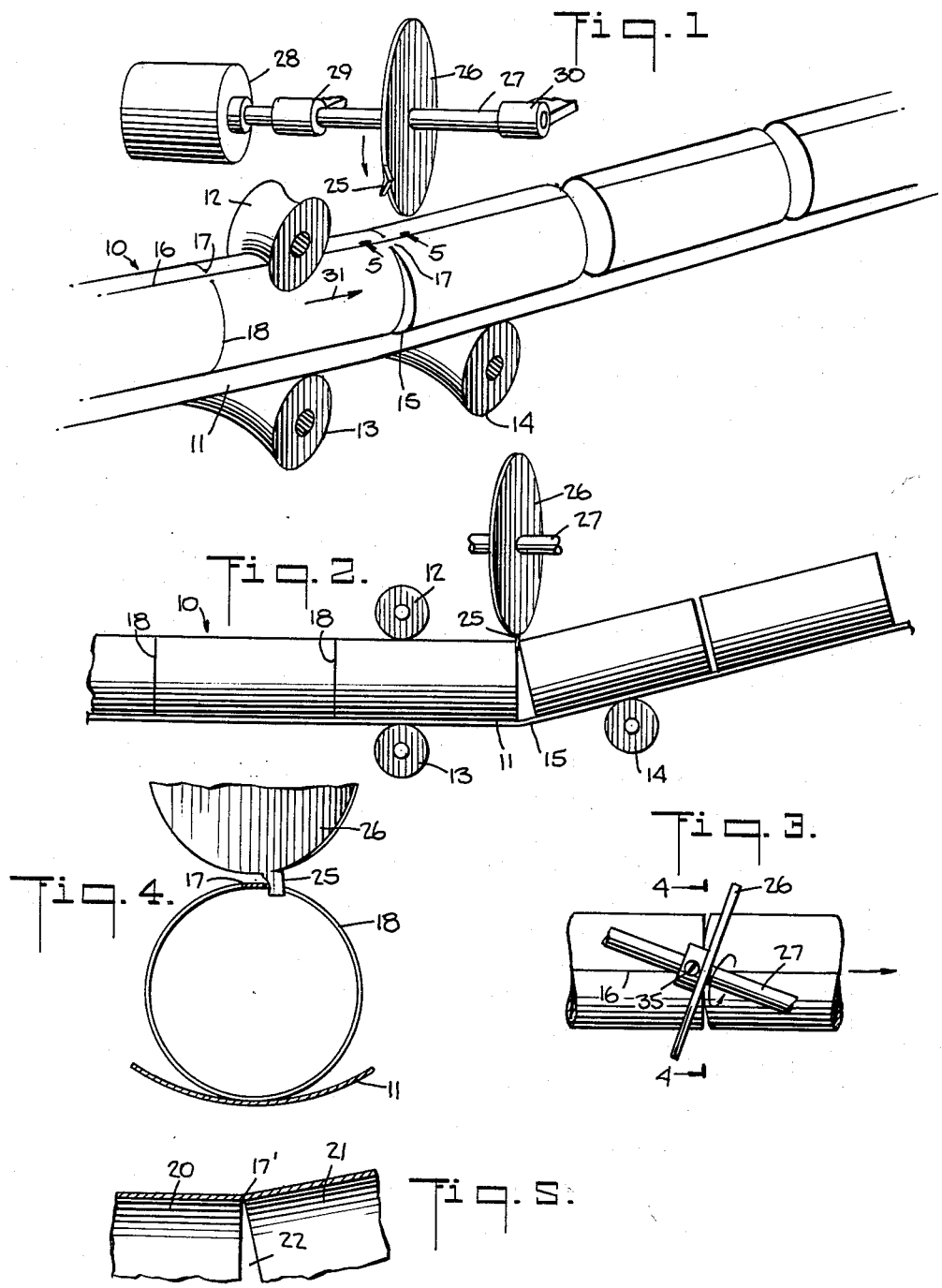

3,183,754
APPARATUS FOR SEPARATING LENGTHS
OF CAN STOCK
Preben W. Jensen, South Norwalk, Conn., assignor to
American Machine & Foundry Company, New York,
N.Y., a corporation of New Jersey
Filed Feb. 6, 1963, Ser. No. 256,733
1 Claim. (Cl. 83—341)

This invention relates to apparatus and methods for separating successive lengths of tubular material, the invention being particularly adapted, among other possible uses, to the separation of attached successive lengths of sheet metal can stock.

Heretofore apparatus and methods have been developed for forming sheet metal can bodies by rapidly advancing a strip of the sheet metal through a tube mill in which the strip is formed into a tube and as the side edges of the strip are brought together, same are longitudinally welded together. In order that such tubing may be more readily separated into finite lengths corresponding to the desired length of each can body, according to one known method the sheet metal strip before passing into the tube mill is transversely slit by slits spaced apart at distances equal to the desired lengths of the can bodies, such slits, however, terminating short of each edge of the strip so that when the strip is formed and welded into a tube, the successive can bodies will each be separated from the next preceding and succeeding ones by such slits, except that narrow unslit tabs are left where the weld line occurs along the can bodies, these unslit tabs being for example from 3/16" to 1/2" wide. Thus the tubular can bodies in this way may be rapidly advanced after the longitudinal welding has been accomplished, as a succession of units, all preferably in axial alignment and all still interconnected but only by such narrow tabs occurring at the weld line.

Inasmuch as by known welding methods such successions of can bodies may be made at very high speed, for example in the range of from 300 to 1000, or even 2000, cans per minute, it becomes desirable to provide some form of automatic means for rapidly, economically and reliably completing the separation of the successive cans from each other.

The present invention provides a solution for this problem by a method and arrangement which involves conveying the succession of interconnected tubular body members preferably at constant speed along a predetermined path. Then as the tubular members pass a predetermined location, each of the tabs is severed by a bladelike means which is mounted to swing or rotate about an axis which is at such an angle to said path that the blade motion will not only have a component at right angles to such path and to each of the tabs, but also a component longitudinally of said path and preferably at the same speed. Since the tabs which are to be severed are relatively narrow, even though the blade is swung on a circular path transverse to the tabs, its forward component of movement during the brief interval while it is severing a tab can readily be made such that the tab will be severed accurately along the desired line, within one or several thousandths of an inch. The blade is arranged to swing about an axis at a radius and with a speed so correlated with the speed of movement of the tubular members that each succeeding tab will be engaged and severed each time the blade swings about its axis, or, of course, a plurality of blades could be arranged to swing or rotate about the same axis in properly timed relation to the movement of the can bodies so one of the blades accurately engages each tab which is to be severed at the proper moment.

In a typical case, the angle of the axis of the rotating blade may be about 20° with respect to the path of movement of the succession of can bodies. The blade may be, of course, arranged to swing at various different radii and along paths at different angles, but the angle and radius, however, are interdependent, with the angle being dependent on the speed of the succession of tubular members to be severed, and the speed of rotation of the blade being dependent on the number of can bodies to be severed per unit of time. These factors may readily be determined or adjusted by trial to best meet various circumstances such as the dimensions of the can bodies and of the tabs, and the speed of manufacture of the tubular material. If only one blade is employed for example, its speed of rotation in revolutions per minute should equal the number of can bodies per minute which are to be severed.

If desired, in order to open somewhat the preformed slits between each two adjacent can bodies, so as to expose the interconnecting tabs for more ready access of the moving blade, the direction of the path of travel of the can bodies may be altered at the location where the severing is to occur, so that the slits will open up to the extent desired for that purpose.

In some cases it may be desired to manufacture the succession of tubular bodies in such manner that same will be interconnected by two or more of the tab-like portions located at circumferentially spaced points. That is, for example, the succession may be connected by tabs at the upper side thereof and by additional tabs along the lower side, in which event of course the severing arrangement may be duplicated with one of same arranged at the upper side and another positioned to sever the tabs along the lower side.

Various further and more specific objects, features and advantages of the invention will appear from the description given below, taken in connection with the accompanying drawings, illustrating by way of example a preferred form of the invention.

In the drawings:

FIG. 1 is a somewhat diagrammatic perspective view of the preferred embodiment of the invention;

FIG. 2 is a side elevational view of portions of the arrangement of FIG. 1;

FIG. 3 is a top view of portions of the same arrangement;

FIG. 4 is a sectional view taken substantially along line 4—4 of FIG. 3; and

FIG. 5 is a broken sectional view taken along line 5—5 of FIG. 1.

Referring to the drawings in further detail, a succession of the interconnected tubular bodies is shown generally at 10 as same are being advanced by suitable known types of conveying means such as indicated at 11 and including one or more rollers as at 12 arranged along the upper portion of the succession for holding same in position on the conveyor, other rollers as at 13 and 14 being provided as necessary or desired to cause the conveyor 11 to change the direction of its path at a region such as indicated at 15 located beneath the location where the tabs are to be severed.

As shown in FIG. 1, the can bodies are longitudinally welded along a line 16, which line preferably extends through the tab areas 17, which interconnect successive can bodies which are otherwise separated where the metal has been preslit as indicated by slits 18.

Due to the change of direction of movement, as is preferred, of the succession of can bodies at the region indicated at 15, each slit upon arrival at that location, as shown in FIG. 5, will become opened. That is, two of the can bodies 20, 21, as interconnected by a tab portion 17', are here shown in section, and the facing end edges of the can bodies 20 and 21 will become separated at an angle as indicated at 22, thus affording easier access to the tab 17' which is to be cut by a blade.

As indicated in the various figures, a cutting blade as at 25 may be mounted, for example, upon the periphery of a disc 26 rotating with a shaft 27, which in turn is driven by a suitable motor 28, including any reduction gearing that may be necessary. The shaft 27 may be mounted upon bearings as at 29 and 30 in a position so that its axis is at the desired angle to the axis of advancing can bodies, as indicated by the arrow 31.

It will be understood that while the blade 25 is mounted to rotate about an axis located at an angle to the path of movement of the can bodies, the blade itself should preferably be in a plane perpendicular to the direction of conveyance of the can bodies. If the blade itself were in a plane positioned at the same angle as the disc 26 for example, and if the blade were of any substantial width, then it would tend to damage or tear the severed edges of the bodies instead of cutting same straight across, as desired. Thus, while the faced view of the blade 25 appears in FIG. 4, its side view is shown in FIG. 2 in which the blade is viewed in right angles to the conveyor path, and the perspective view of FIG. 1 more clearly indicates the "skewed" position which the blade will have with respect to the plane of the disc 26.

Suitable gearing (not shown) is preferably provided to interconnect whatever driving means is used for the conveyor with the motor drive means 28, so that the same will be operated with the desired synchronism and with the knife blade 25 moving in appropriate timed relation to engage each one of the tabs 17 as it arrives in its position to be severed. In order for the blade 25 to arrive in the correct angular position for meeting and severing each of the tabs 17 at the proper time, the angular position of the supporting disc 26 or the like may be adjusted as by set screw means such as indicated at 35 (see FIG. 3).

Although a particular embodiment of the invention is herein disclosed for purposes of explanation, further modifications thereof, after study of this specification, will be apparent to those skilled in the art to which the invention pertains. Reference should accordingly be had to the appended claim in determining the scope of the invention.

What is claimed and desired to be secured by Letters Patent is:

Apparatus for separating a succession of thin sheet metal tubular members for forming can bodies and the like, each of such succession being connected to the succeeding one by a narrow tab-like portion of the sheet metal integral with the trailing end edge of one member and the forward end edge of the next, the members being otherwise separated by transverse slits, said apparatus comprising in combination: means for conveying the succession of members along a predetermined path and at a predetermined speed past a tab-severing location which is relatively fixed in position, said conveying means being shaped and positioned to cause at such location, said path of the members to veer somewhat in a direction to cause said slits to open and expose said tabs for severing; a blade at said location rotatable about an axis which is relatively fixed in a position spaced from said path and in a region with respect to said tabs opposite from said open slits; power means for rotating said blade at a speed and with timing correlated with the conveyor movement, whereby the blade transversely engages and severs the tabs edgewise as same pass said location, said axis extending obliquely with respect to the direction of said path at an angle such that the rotating blade motion has a component along the direction of said path and with a speed in such direction approximating the speed of conveyance of said succession of members.

References Cited by the Examiner

UNITED STATES PATENTS

| | | | |
|---|---|---|---|
| 745,965 | 12/03 | Lyon | 83—355 |
| 2,048,360 | 7/36 | Spanel et al. | 164—69.3 |
| 2,195,849 | 4/40 | Carroll | 83—596 |
| 2,205,036 | 6/40 | Hamel | 83—596 |
| 2,753,000 | 7/56 | Marek | 83—596 |
| 2,925,946 | 2/60 | Grauer | 83—418 |
| 2,984,138 | 5/61 | Vitense | 83—310 |
| 2,997,904 | 8/61 | Gotsch et al. | 83—165 X |

FOREIGN PATENTS 792,266   12/35   France.

ANDREW R. JUHASZ, *Primary Examiner.*
HUNTER C. BOURNE, JR., *Examiner.*